US012638343B2

(12) United States Patent
You et al.

(10) Patent No.: US 12,638,343 B2
(45) Date of Patent: May 26, 2026

(54) SINGLE-POINT TEMPERATURE CALIBRATION OF RESISTANCE-BASED TEMPERATURE MEASUREMENTS

(71) Applicant: CIRRUS LOGIC INTERNATIONAL SEMICONDUCTOR LTD., Edinburgh (GB)

(72) Inventors: Zhong You, Austin, TX (US); Vamsikrishna Parupalli, Austin, TX (US); Johann G. Gaboriau, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 578 days.

(21) Appl. No.: 17/884,517

(22) Filed: Aug. 9, 2022

(65) Prior Publication Data

US 2023/0366754 A1 Nov. 16, 2023

Related U.S. Application Data

(60) Provisional application No. 63/340,741, filed on May 11, 2022.

(51) Int. Cl.
*G01K 15/00* (2006.01)
*G01K 7/16* (2006.01)

(52) U.S. Cl.
CPC ............. *G01K 15/005* (2013.01); *G01K 7/16* (2013.01); *G01K 2219/00* (2013.01)

(58) Field of Classification Search
CPC .... G01K 15/005; G01K 7/16; G01K 2219/00; G01K 15/00
See application file for complete search history.

(56) References Cited

U.S. PATENT DOCUMENTS 7,901,130 B2 3/2011 Limb et al.
8,444,255 B2 5/2013 Bakker et al.
(Continued)

FOREIGN PATENT DOCUMENTS

CA 2617402 A1 6/2004
DE 3808475 A1 * 10/1989
(Continued)

OTHER PUBLICATIONS

Notice of Allowance in U.S. Appl. No. 17/884,521 mailed on May 29, 2024. (pp. 1-14 in pdf).
(Continued)

*Primary Examiner* — Laura Martin
*Assistant Examiner* — Julia Fitzpatrick
(74) *Attorney, Agent, or Firm* — Mitch Harris, Atty at Law, LLC; Andrew M. Harris

(57) ABSTRACT

A system and method provide on-line, wafer-level, die-level, or package-level thermal calibration of an integrated measurement resistor with a single temperature insertion. The system includes a measurement resistor integrated on a substrate with an unknown temperature coefficient and a temperature reference sensor thermally coupled to the measurement resistor. A measurement circuit measures an indication of a resistance of the measurement resistor. An electrically-controllable integrated heat source is operated by a controller to change a temperature of the measurement resistor and the temperature reference sensor and stores values of the resistance indication and the sensed temperature corresponding to multiple temperatures of the temperature of the measurement resistor and the temperature reference sensor. The controller generates or approximates a mathematical relationship between the resistance of the measurement resistor and the temperature of the measure- (Continued)

ment resistor and the temperature reference sensor from the stored values.

20 Claims, 6 Drawing Sheets

(56) References Cited

U.S. PATENT DOCUMENTS

| | | | |
|---|---|---|---|
| 9,176,089 B2 | 11/2015 | Le Neel et al. | |
| 9,559,162 B2 | 1/2017 | Daley et al. | |
| 9,810,589 B2 * | 11/2017 | Sinha | G01K 15/005 |
| 10,123,143 B2 | 11/2018 | Parupalli et al. | |
| 11,594,432 B2 | 2/2023 | Liu et al. | |
| 2007/0258503 A1 * | 11/2007 | Clark, Jr | G01K 7/015 |
| | | | 374/161 |
| 2009/0296769 A1 * | 12/2009 | Fiennes | G01K 15/005 |
| | | | 374/1 |
| 2018/0156675 A1 * | 6/2018 | Kumahara | G01K 15/007 |
| 2021/0407992 A1 * | 12/2021 | Liu | H10D 84/209 |
| 2022/0102271 A1 | 3/2022 | Ku et al. | |

FOREIGN PATENT DOCUMENTS

| | | | | |
|---|---|---|---|---|
| EP | 3417205 B1 | 11/2019 | | |
| GB | 2547978 A * | 9/2017 | | G01K 1/026 |
| WO | WO-2013037417 A1 | 3/2013 | | |
| WO | WO-2017138380 A1 | 1/2017 | | |
| WO | WO-2018022757 A1 | 2/2018 | | |

OTHER PUBLICATIONS

U.S. Patent Application "Integrated Thin-Film Resistive Sensor With Integrated Heater and Metal Layer Thermal Equalizer", Ser. No. 17/884,52', filed on Aug. 9, 2022. (pp. 1-34 in pdf).
U.S. Patent Application "Integrated Thin-Film Resistive Sensor With Integrated Heater and Metal Layer Thermal Equalizer", U.S. Appl. No. 17/884,521, filed Aug. 9, 2022. (pp. 1-31 in pdf).

* cited by examiner

SINGLE-POINT TEMPERATURE CALIBRATION OF RESISTANCE-BASED TEMPERATURE MEASUREMENTS

The present Application Claims priority under 35 U.S.C. § 119(e) to U.S. Provisional Patent Application 63/340,741 filed on May 11, 2022, the disclosure of which is incorporated herein by reference.

BACKGROUND

1. Field of Disclosure

The field of representative embodiments of this disclosure relates to systems, including integrated circuits (ICs) that perform resistance-based temperature measurement, and more particularly to a system in which resistance-based temperature measurements are calibrated using a single controlled temperature/temperature insertion resistance measurement to calibrate the measurements.

2. Background

Resistive sensors are found in current-sensing and voltage-sensing applications, for example in audio amplifiers and motor controllers, in which the output current is measured by including a series resistance in the output circuit, i.e., the circuit driving the particular load(s), e.g., speakers or motor windings. In order to provide accurate results, the ambient temperature of the resistance must typically be known, as well as the temperature coefficient of the specific resistor, as resistive materials typically exhibit a wide degree of variation of resistivity with temperature.

In order to provide an accurate estimate of a resistor's temperature coefficient and initial resistance, calibration measurements and subsequent resistance compensation are typically required, as resistors also typically exhibit substantial variation in fabrication, due to resistive material concentration variation and geometric variations of the fabricated resistor. Depending on the resistive material, a simple linear compensation may not yield sufficiently accurate results over the temperature range the device can be expected to encounter, which further increases the number of data points that are required to characterize and compensate for a particular device.

While laboratory measurements of resistor characteristics can provide information about a range of variation of a fabricated resistor, such measurements are not practical in quantity. In particular, for high-volume integrated circuit (IC) production, for ICs in which the sense resistor is integrated on a die or within an IC package, performing die-level, wafer-level, or package-level tests on individual ICs in a thermally-controlled environment is typically a costly and slow part of the fabrication and test process.

Therefore, it would be advantageous to provide an IC, system and method that provide an accurate thermally-calibrated resistive sensor, without requiring extensive factory-level testing in a thermally-controlled environment.

SUMMARY

Thermal calibration and compensation are provided in integrated circuit (IC), a method of manufacture of the IC, and systems/methods that enable on-line, package-level, die-level or wafer-level calibration of a particular sense resistor or group of sense resistors. In particular, the method and system are capable of single-test-insertion thermal calibration of a resistive sensor.

The system includes a measurement resistor integrated on a substrate with an unknown temperature coefficient, a temperature reference sensor thermally coupled to the measurement resistor, a measurement circuit for measuring an indication of a resistance of the measurement resistor, an analog-to-digital converter having an input coupled to the temperature reference sensor for providing an indication of a temperature of the measurement resistor and the temperature reference sensor, an electrically-controllable heat source integrated on the substrate and thermally coupled to the measurement resistor and the temperature reference sensor, and a controller having an output coupled to the electrically-controllable heat source, an input coupled to an output of the analog-to-digital converter and another input coupled to an output of the measurement circuit. The controller may operate the electrically-controllable heat source to change a temperature of the measurement resistor and the temperature reference sensor and store values of the indication of the resistance of the measurement resistor provided from the measurement circuit and values of the indication of a temperature of the measurement resistor and the temperature reference sensor corresponding to multiple temperatures of the temperature of the measurement resistor and the temperature reference sensor. The controller may further generate or approximate a mathematical relationship between the resistance of the measurement resistor and the temperature of the measurement resistor and the temperature reference sensor from the stored values.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses systems and methods that may provide on-line, wafer-level, die-level, or package-level thermal calibration of an integrated measurement resistor with a single temperature insertion. The system includes a measurement resistor integrated on a substrate with an unknown temperature coefficient and a temperature reference sensor thermally coupled to the measurement resistor. A measurement circuit measures an indication of a resistance of the measurement resistor. An electrically-controllable integrated heat source is operated by a controller to change a temperature of the measurement resistor and the temperature reference sensor and stores values of the resistance indication and the sensed temperature corresponding to multiple temperatures of the temperature of the measurement resistor and the temperature reference sensor. The controller may then generate or approximate a mathematical relationship between the resistance of the measurement resistor and the temperature of the measurement resistor and the temperature reference sensor from the stored values. The mathematical relationship may then be used to provide calibration from a single temperature insertion by obtaining the resistance indication at the inserted temperature and using the mathematical relationship to correct measurements made at other measured temperatures.

Figure 1:
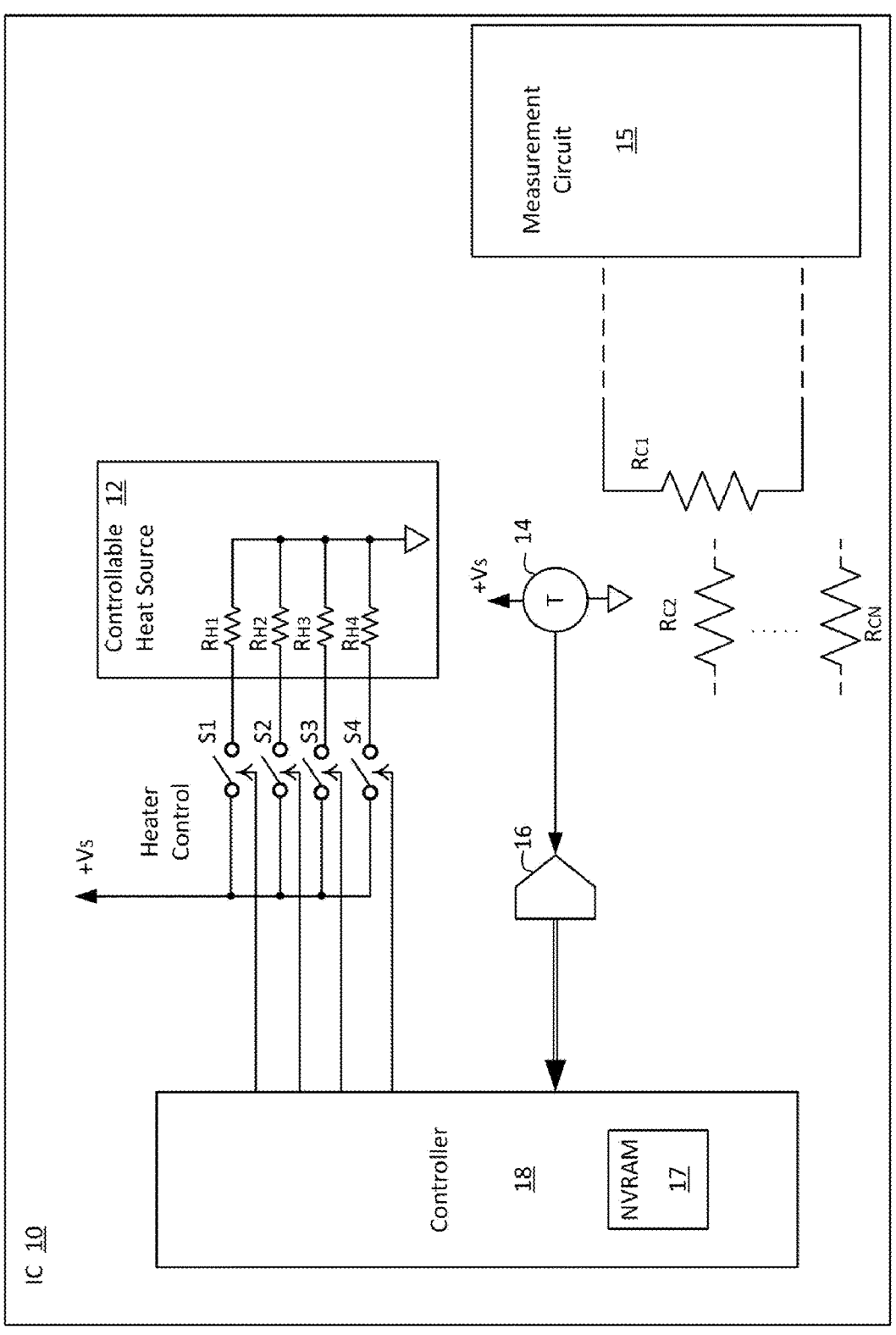
FIG. 1 is a block diagram showing an example integrated circuit 10, in accordance with an embodiment of the disclosure.

Referring now to FIG. 1, a block diagram is shown, illustrating an example integrated circuit (IC) 10, in accordance with an embodiment of the disclosure. Example integrated circuit 10 implements a system that includes a controller 18, which performs measurements and calibration actions to estimate a resistance of a resistor $R_C$ within example IC 10 and generate information about the thermal characteristics of resistor $R_C$ that may be used in subsequent calculations. The subsequent calculations may be performed by controller 18 or another processing device, in accordance with temperature coefficient information stored within a non-volatile memory (NVRAM) 17. Resistor $R_{C1}$ may, for example, be part of a series-connected loudspeaker, earspeaker, motor or other circuit, and used to sense the current passing through the circuit by measuring a voltage drop across resistor $R_{C1}$. In other examples, resistor $R_{C1}$ may be used to measure a voltage, by measuring a current through resistor $R_{C1}$. By knowing the present temperature of resistor $R_{C1}$, and temperature coefficient(s) of resistor $R_{C1}$ that describe the temperature variation of the resistance of resistor $R_{C1}$, accurate results may be obtained in such current and voltage measurements beyond those that use either a fixed-resistance value or a temperature-corrected value that is only based on a known/average temperature coefficient for resistor $R_{C1}$. In order to perform on-line, package level, die-level or wafer-level measurement of the temperature characteristics of resistor $R_C$, a controllable heat source 12 is provided within example IC 10, which in the example is a set of selectable resistors $R_{H1}$-$R_{H4}$. While switched resistors are provided as one example of a controllable heat source, other implementations are contemplated by the disclosure, including a variable voltage source/variable current source that may supply a single heat source resistor with a variable level of heat. By setting a fixed level of heat, the temperature of resistor $R_C$ within example IC 10 may be allowed to stabilize and a resistance of resistor $R_C$ measured by a measurement circuit 15. The value of the resistance measurement, and the value of the temperature of resistor $R_C$ may be stored for use in determining a mathematical description of the temperature-dependence of the resistance of thin-film resistor $R_C$. In some implementations, resistor $R_C$ may be dedicated for thermal characterization of multiple resistors $R_{C2}$-$R_{CN}$ included within integrated circuit 20, with the expectation that their thermal behavior will be the same, or resistor $R_C$ may be, as described above, be part of another circuit that may be either selectively enabled/coupled to resistor $R_C$, or capable of performing the resistance measurement itself. Control of heat source 12, which is provided by switches S1-S4 in the example, may be internal to example IC 10, as shown in FIG. 1, or both of measurement circuit 15 and/or controller 18 may be external to example IC 10.

In order to determine the temperatures at which measurements of the resistance of resistor $R_{C1}$ are obtained, and also to determine the ambient temperature of thin-film resistor $R_{C1}$ at any future time for appropriate calibration of subsequent measurements using thin-film resistor $R_{C1}$, a reference temperature sensor 14 is incorporated within example IC 10 and coupled to controller 18 via an analog-to-digital converter 16. In order to ensure that the temperatures of temperature sensor 14 and resistor $R_{C1}$ are the same and that heat from controllable heat source 12 is evenly distributed across resistor $R_{C1}$, resistor $R_{C1}$ may be a thin-film resistor structure within example IC 10 that includes thermal management features and thermal coupling features as described in co-pending U.S. Patent Application entitled: "INTEGRATED THIN-FILM RESISTIVE SENSOR WITH INTEGRATED HEATER AND METAL LAYER THERMAL EQUALIZER", and filed on the same date as the instant U.S. Patent Application. The disclosure of the above-referenced U.S. Patent Application is incorporated herein by reference. With close thermal coupling of controllable heat source 12, reference temperature sensor 14, and (thin-film) resistor $R_C$ temperature equality is sufficient to provide the needed measurements and subsequent calibration calculations. Controller 18 generates or approximates a mathematical relationship relating the resistance of resistor $R_C$ to measured temperature, which may be represented as coefficients of a linear, piecewise linear, quadratic or other higher-order polynomial or transcendental function approximation that fits the resistance vs. temperature measurements. Once the mathematical relationship has been defined, a single insertion resistance/temperature measurement may be used to calibrate the system implemented by example IC 10, which sets the initial resistance value of the mathematical relationship for the measured temperature. Controller 18 may be, for example, a microcontroller core that performs computations according to a program stored in NVRAM 17 to obtain the coefficients of the mathematical relationships and store the coefficients in NVRAM 17. Another program performs the calibration and may directly compute resistance (or other resistance-dependent values) from a measured temperature, the stored coefficients and the single point resistance/temperature measurement.

Figure 2:
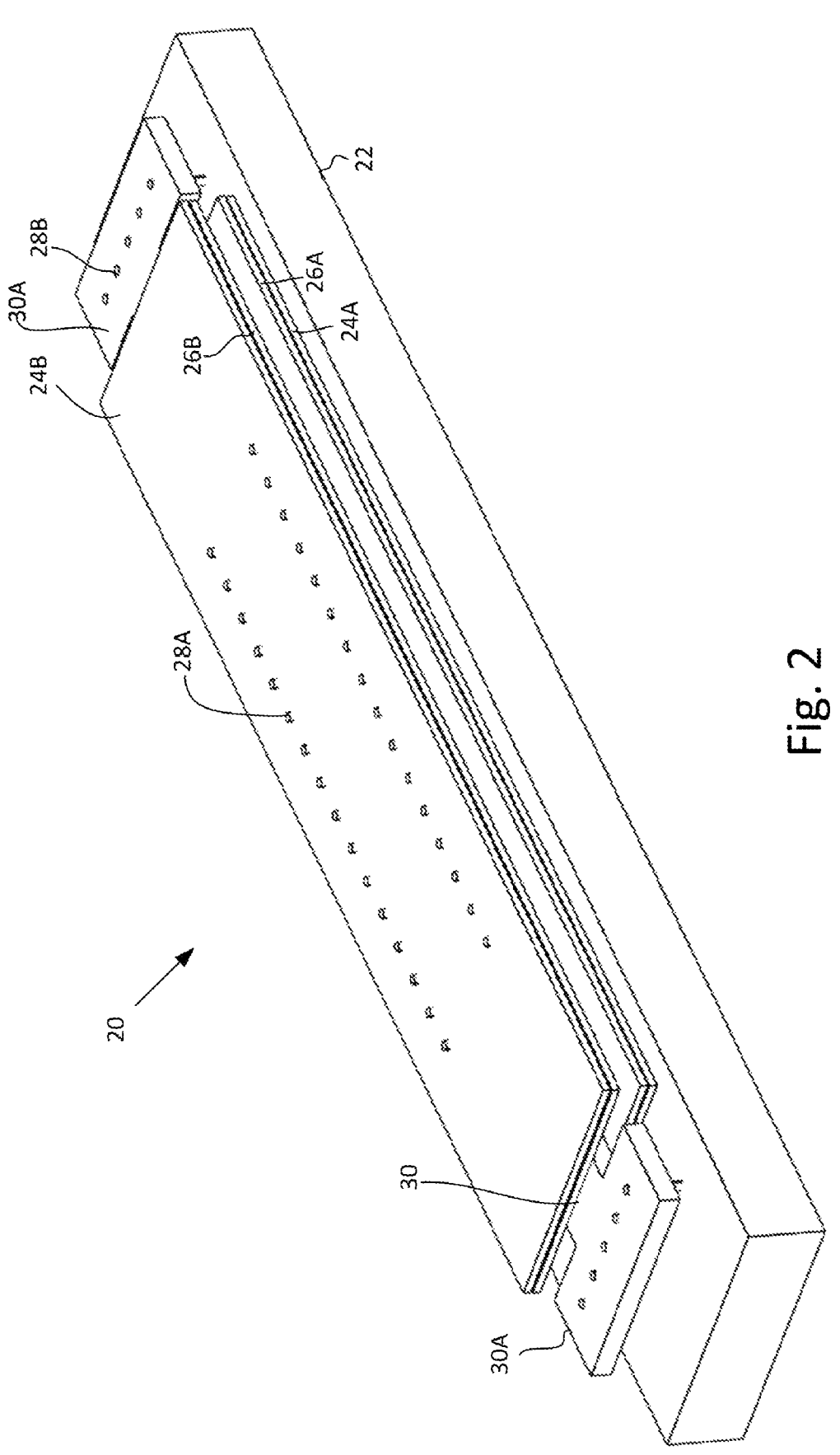
FIG. 2 is a perspective view of an example integrated circuit assembly 20, that may be used to implement example integrated circuit 10, in accordance with an embodiment of the disclosure.

Referring now to FIG. 2, a perspective view of an example integrated circuit assembly 20 is shown, in accordance with an embodiment of the disclosure, and as disclosed in the above-incorporated U.S. Patent Application, and in which the features of example IC 10 may be incorporated. A thin-film resistor 30, is enclosed in a temperature-equalizing structure provided by a first metal layer 24A disposed beneath thin-film resistor 30 and a second metal layer 24B disposed above thin-film resistor 30. Since metal layers 24A, 24B will generally be laminated or deposited atop a substrate 22, an insulating layer 26A is provided between metal layer 24A and thin-film resistor 30, and an insulating layer 26B is provided between thin-film resistor 30 and metal layer 24B. A first plurality of metal vias 28A connects metal layers 24A, 24B along the length of thin-film resistor 30 on both sides of thin-film resistor 30 and further extend to substrate 22, which may be heated to raise the temperature of thin-film resistor 30 as described above. Electrical connections to thin-film resistor 30 are provided at extensions 30A of the ends of thin-film resistor 30 outside of the region occupied by metal layers 24A, 24B, by a second plurality of vias 28B that may also provide thermal coupling of thin-film resistor 30 to substrate 22. By surrounding almost all of the body of thin-film resistor 30 with the thermal-equalizing structure provided by 24A, 24B and vias 28A, and by coupling the ends of thin-film resistor 30 to substrate 22 with vias 28B, the temperature of substrate 22 near thin-film resistor 30, as described below, will closely match the temperature thin-film resistor 30, and the temperature of thin-film resistor 30 should be substantially equal across the length and width of thin-film resistor 30. Controllable heat source 12 and temperature sensor 14 are thermally coupled to vias 28A, e.g., by integrating selectable resistors $R_{H1}$-$R_{H4}$ and temperature sensor 14 on substrate 22 proximate vias 28A and underneath metal layer 24A. The remainder of elements illustrated within example IC 10 of FIG. 1 may be integrated elsewhere on substrate 22.

Figure 3:
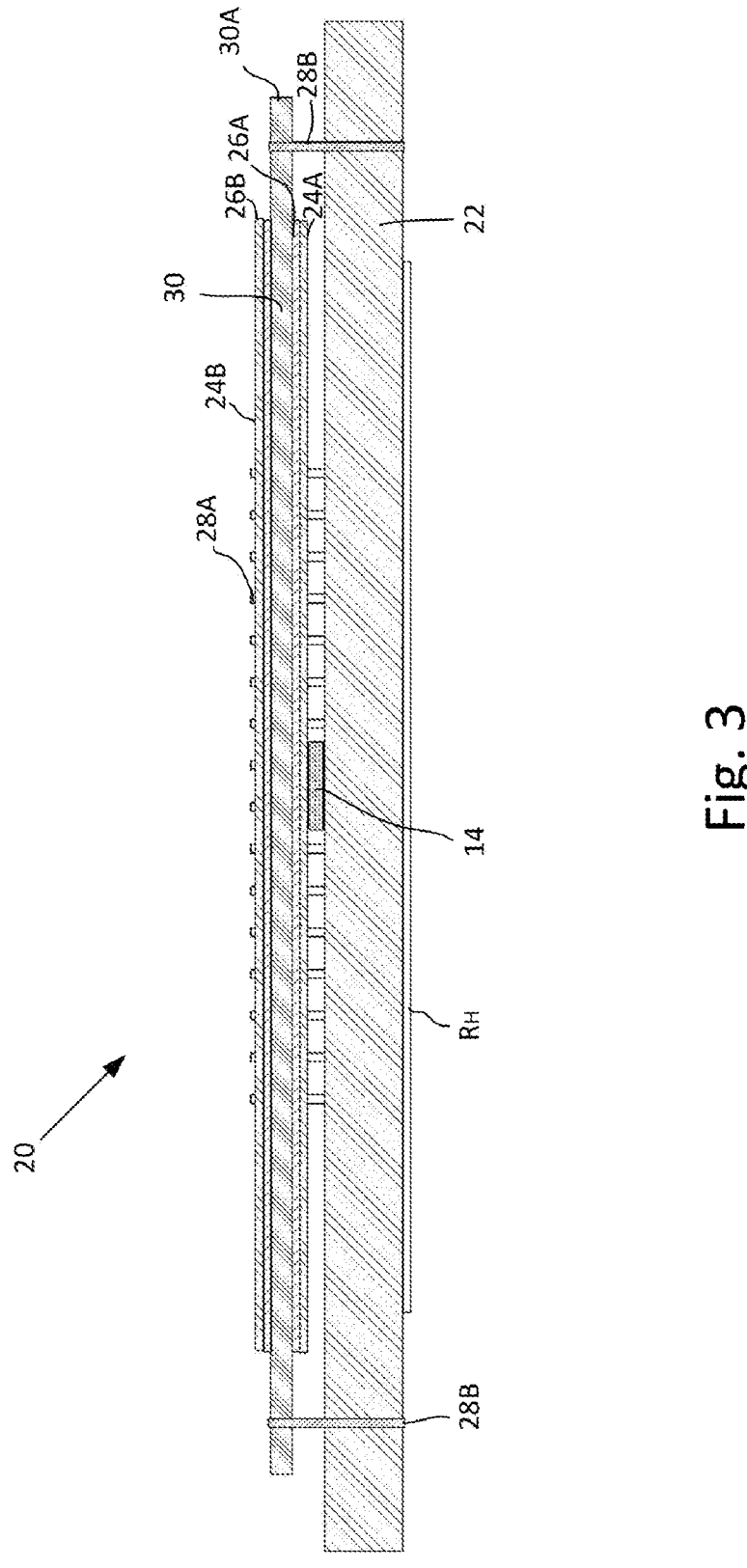
FIG. 3 is a cross-section view of integrated circuit assembly 20 of FIG. 2, in accordance with an embodiment of the disclosure.

Referring now to FIG. 3, a cross-section view of example integrated circuit assembly 20 of FIG. 2 is shown, in accordance with an embodiment of the disclosure. Reference temperature sensor 14 is located between metal layer 24A and a top surface of substrate 22 and may contact metal layer 24A, as well as substrate 22. Heating resistors $R_H$ are located on a bottom face of substrate 22. Extensions 30A of thin-film resistor 30 are seen extending past the region of metal layers 24A, 24B, so that vias 28B are capable of providing electrically-isolated connections to thin film resistor 30. While example integrated circuit assembly 20 of FIG. 2 and FIG. 3 as disclosed in the above-incorporated U.S. Patent Application, as well as other embodiments of integrated circuit structures disclosed therein, may be used to provide a calibrated integrated circuit resistor as incorporated in the systems and used in the methods described herein, the specific structural implementation of such examples is not a requirement of the present disclosure, as resistors other than thin-film resistors, and resistors not enclosed in the thermal management structures disclosed in the above-incorporated U.S. Patent Application may also be calibrated by the techniques disclosed herein.

Figure 4A:
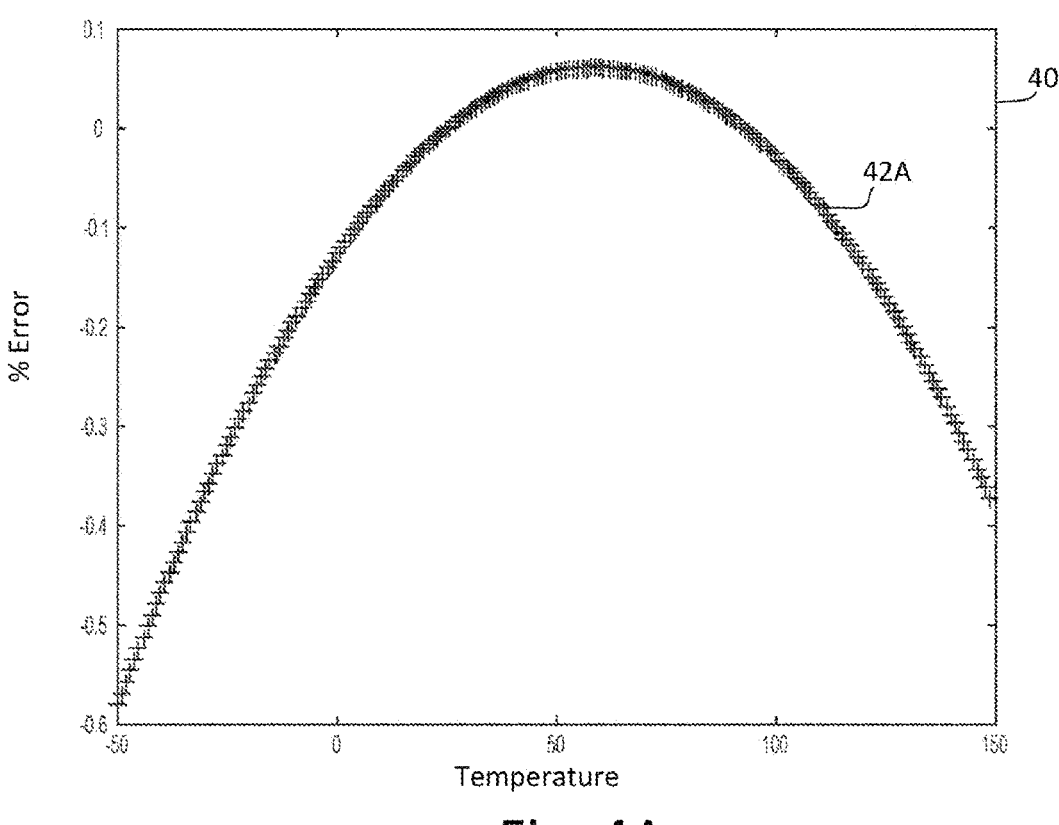
FIG. 4A is a graph depicting variation of resistance error of an example resistor within integrated circuit 10 that may be temperature-compensated by techniques in accordance with embodiments of the disclosure.

Referring now to FIG. 4A, a graph 40 depicts a variation of uncorrected resistance measurement error 42A of an example resistor that may be corrected by the system implemented by example IC 10. Since, for a fixed current through a sense resistor, the voltage is proportional to the resistance, graph 40 also conforms to the shape of an error in sense voltage, i.e., the error in a voltage drop across the resistor when the resistor is used to sense current. As will be illustrated below, controller 18 may correct a resistance value, or an indication of resistance, such as voltage drop. The percentage error in the resistance measurement is illustrated as a function of temperature, which will affect any measurement involving the example resistor, e.g., voltage drop, as mentioned above, or a current measurement, in which the current for a fixed voltage is inversely proportional to the resistance. As seen, near the extremes of the measurement temperature range, at 150 degrees Celsius and at approximately −40 degrees Celsius, the error in the measured resistance is approximately 0.4%.

The system implemented by example IC 10, as described above, generates or approximates a mathematical relationship between the resistance of resistor $R_{C1}$ as measured at one temperature and the resistance of resistor $R_{C1}$ at another temperature. Therefore, once an ambient temperature is measured and an indication of the resistance of resistor $R_{C1}$ is obtained at that temperature, the resistance of resistor $R_{C1}$ can be accurately obtained at another measured temperatures, without requiring another indication of the resistance of resistor $R_{C1}$ at that other temperature. For example, a mathematical relationship for a measured voltage $V_{meas}$ across the resistor $R_{C1}$ as a function of temperature may be determined from:

$$V_{meas} = i_{rc} * R_0 (1 + TCR_1 \Delta T + TCR_2 \Delta T^2),$$

where T is temperature, $i_{rc}$ is a current through resistor $R_{C1}$, $R_0$ is a base resistance value for resistor $R_{C1}$, and $TCR_1$ and $TCR_2$ are correction factors that may be determined to describe the behavior of the sense resistor with respect to changing temperature. Although a second order polynomial equation is illustrated by the example above, other equations, including higher-order polynomials, or other empirical function expressions may be used to describe a mathematical relationship of resistor $R_{C1}$ as a function of temperature. The correction factors $TCR_1$ and $TCR_2$ may be stored in NVRAM 17 subsequently used to correct measurements. The correction factors may be preloaded as values determined at test or the correction factors may be determined at a start-up or initialization period of example IC 10. A voltage drop correction value $V_{corr}$ may then be calculated as:

$$V_{corr} = i_{rc} R_0 (1 + TCR_1 \Delta T + TCR_2 \Delta T^2)(TCR_1 \Delta T + TCR_2 \Delta T^2),$$

and the computed $V_{corr}$ value may be added to a measured voltage drop value to obtain a calibrated measurement value $V_{calib}$ to compensate for variations in the resistor $R_{C1}$, when resistor $R_{C1}$ is used to sense current via voltage drop $V_{meas}$ across resistor $R_C$. The $V_{calib}$ value may then be used by other circuitry to determine a sense current and used for further control of a system incorporating resistor $R_{C1}$ as a sense resistor.

Figure 4B:
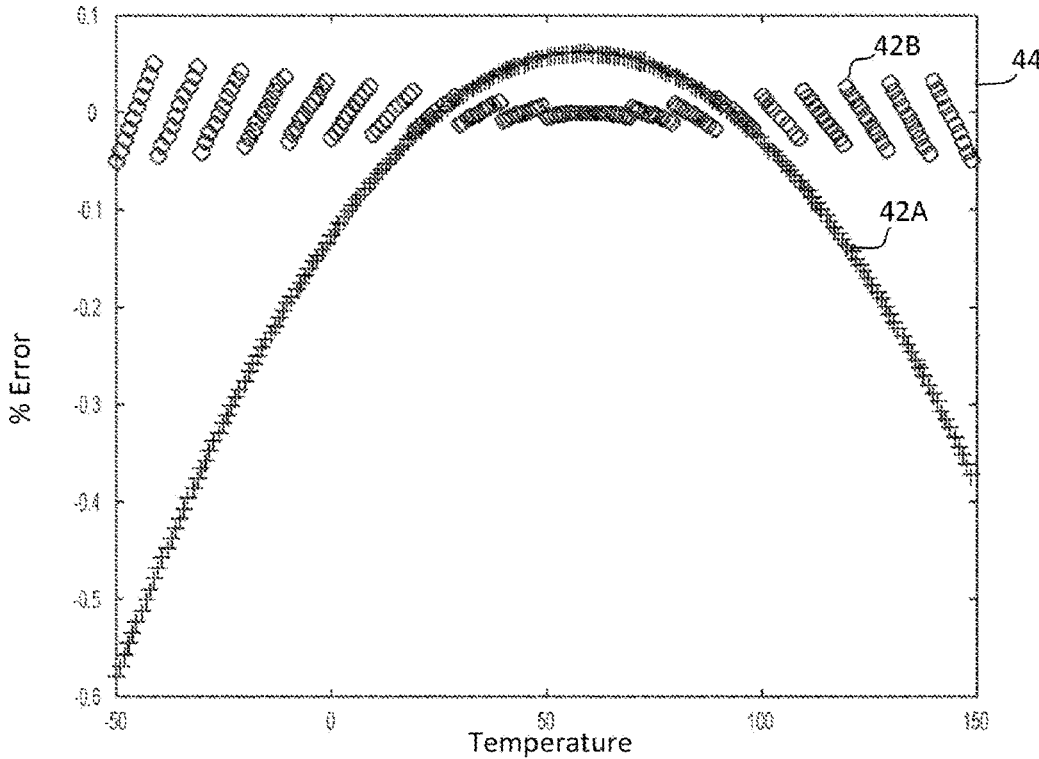
FIG. 4B is a graph depicting residual error compared to the variation of resistance error of the example resistor after correction in example integrated circuit 10, in accordance with an embodiment of the disclosure.

Referring now to FIG. 4B, a graph 44 depicts a residual error 42B, compared to the variation of uncorrected resistance error 42A of the example resistor after correction by the system implemented by example IC 10, in accordance with an embodiment of the disclosure. As can be seen in graph 44, the corrected resistance error 42B is zero at one point within multiple temperature ranges, which may or may not correspond to temperature data points for which the exact resistance was measured by example IC 10. For example, if the mathematical relationship modeled by controller 18 is a polynomial having an order sufficient to fit the temperature/resistance measurement data exactly at multiple curve-fit points, then the error will be zero at temperatures corresponding to those curve-fit points, and be limited in value due to the limited error in the resistance measurement that exists between the curve-fit points, as shown in corrected resistance error 42B. For a quadratic (second-order) model as given by the example above, the zero-error points will not necessarily fall on the measured temperatures, but the error due to the difference between the exact resistance values and the modeled resistance values will be limited within the multiple temperature ranges depicted in graph 44. Within the individual temperature ranges between the zero-error points, the error is generally within +/−0.05% resistance error, which is at least a 10× improvement over uncorrected resistance error 42A. As mentioned above, controller 18 may make corrections based on a comparison of measured voltage drop with expected voltage drop values.

Figure 5:
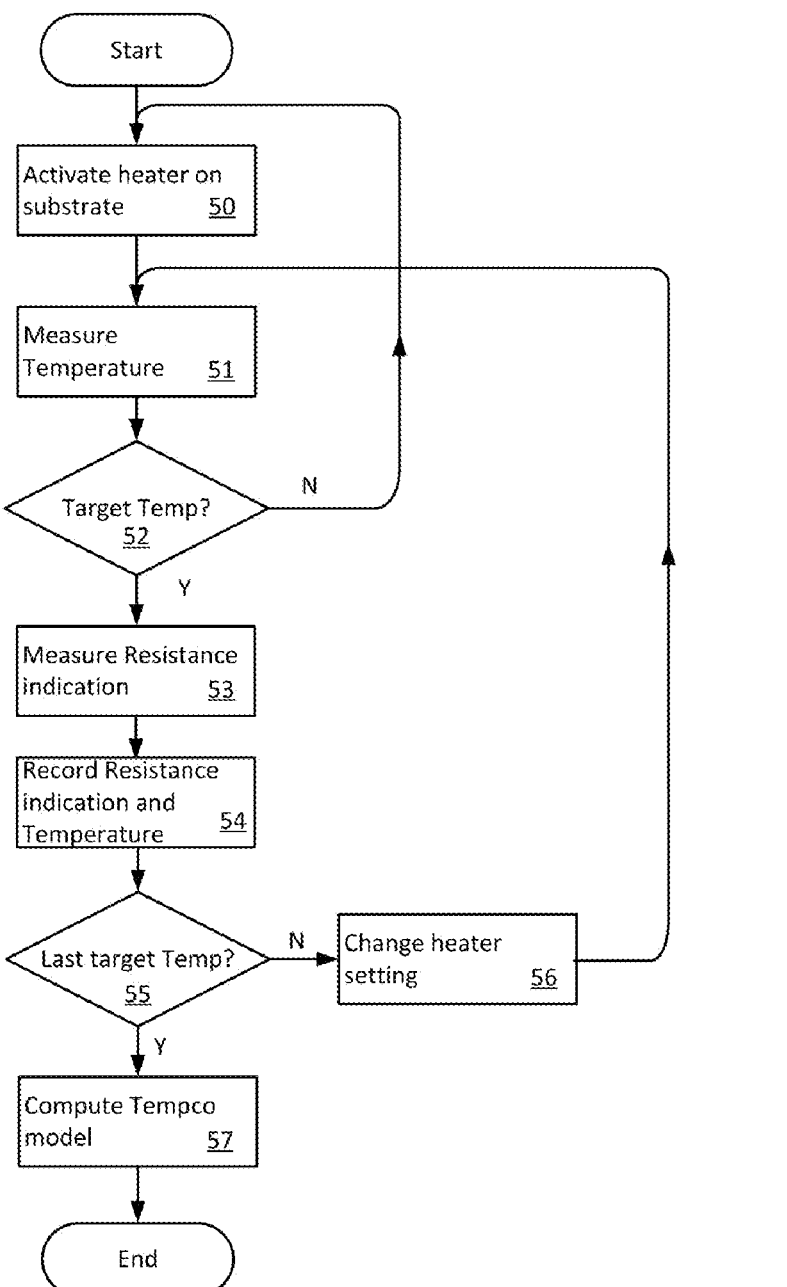
FIG. 5 is a flowchart depicting a method that may be carried out by controller 18 of example integrated circuit 10, in accordance with an embodiment of the disclosure.

Referring now to FIG. 5, a flowchart depicting a method that may be carried out by controller 18 of example IC 10 is shown, in accordance with an embodiment of the disclosure. First, controllable heat source 12 is activated on substrate 22 (step 50). The temperature output from temperature sensor 14 is measured (step 51) until a target temperature is reached (decision 52). Once the target temperature is reached, the indication of resistance of resistor $R_{C1}$ is obtained (step 53) and stored along with the measured temperature (step 54) in NVRAM 17. Until the last target temperature has been reached (decision 55), the heater setting is changed (step 56) and the temperature output from temperature sensor 14 is again measured (step 51) until the next target temperature is reached (decision 52). At the next target temperature (decision 52) the indication of resistance of resistor $R_{C1}$ is obtained (step 53) and stored along with the measured temperature (step 54) in NVRAM 17. Once the resistance of resistor $R_{C1}$ is obtained at all of the target temperatures, the temperature-compensation (Tempco) model may be computed by controller 18 (step 57) and used for subsequent measurement corrections.

Figure 6:
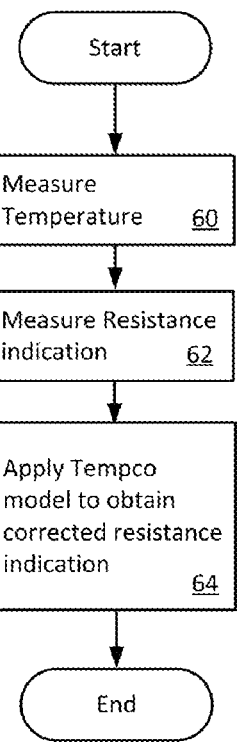
FIG. 6 is a flowchart depicting another method that may be carried out by controller 18 of example integrated circuit 10, in accordance with an embodiment of the disclosure.

Referring now to FIG. 6, a flowchart depicting another method that may be carried out by controller 18 of example system 10, in accordance with an embodiment of the disclosure. The temperature of resistor $R_{C1}$ is measured (step 60), along with the indication of resistance of resistor $R_{C1}$ (step 62), e.g., a voltage drop across resistor $R_{C1}$, and a corrected resistance indication is computed from the Tempco model (step 64). For example, in systems in which resistor $R_{C1}$ is used to measure current by measuring a voltage drop with measurement circuit 15, an accurate current measurement value may be computed directly from the voltage drop by applying the Tempco model to the voltage drop across resistor $R_{C1}$. Similarly, when resistors $R_{C2}$-$R_{CN}$ are included and used to measure other currents, the current measurement values may be corrected by the same Tempco model obtained for resistor $R_{C1}$, as the resistance values of resistors $R_{C2}$-$R_{CN}$ should closely track the resistance of resistor $R_{C1}$.

As mentioned above, portions of the disclosed processes may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions executed by a digital signal processor (DSP) or other processor that executes computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the block diagram block or blocks.

In summary, this disclosure shows and describes systems and methods for providing a thermally compensated resistor-based measurement. The methods are methods of operation of the systems. The systems may include a measurement resistor integrated on a substrate and having an unknown temperature coefficient, a temperature reference sensor thermally coupled to the measurement resistor, a measurement circuit for measuring an indication of a resistance of the measurement resistor, an analog-to-digital converter having an input coupled to the temperature reference sensor for providing an indication of a temperature of the measurement resistor and the temperature reference sensor, an electrically-controllable heat source integrated on the substrate and thermally coupled to the measurement resistor and the temperature reference sensor, and a controller having an output coupled to the electrically-controllable heat source, a first input coupled to an output of the analog-to-digital converter and a second input coupled to an output of the measurement circuit. The controller may operate the electrically-controllable heat source to change a temperature of the measurement resistor and the temperature reference sensor and may store first values of the indication of the resistance of the measurement resistor provided from the measurement circuit and second values of the indication of a temperature of the measurement resistor and the temperature reference sensor corresponding to multiple temperatures of the temperature of the measurement resistor and the temperature reference sensor. The controller may further generate or approximate a mathematical relationship between the resistance of the measurement resistor and the temperature of the measurement resistor and the temperature reference sensor from the first and second values.

In some example embodiments, the controller may further determine a resistance of the measurement resistor with the electrically-controllable heat source disabled, by receiving a measure of an ambient temperature of the measurement resistor and the temperature reference sensor from the analog-to-digital converter and an indication of an ambient temperature resistance from the measurement circuit, and may apply the mathematical relationship to the measure of the ambient temperature of the measurement resistor and the temperature reference sensor and the ambient temperature resistance from the measurement circuit to correct the ambient temperature resistance. In some example embodiments, the controller may operate the electrically-controllable heat source and store the first values and second values during a wafer or a package test, and the controller may further generate or approximate the mathematical relationship during the wafer or package test. The controller may receive the measure of the ambient temperature of the measurement resistor and the temperature reference sensor from the analog-to-digital converter and may receive an indication of an ambient temperature resistance from the measurement circuit during on-line operation and may apply the mathematical relationship to the measure of the ambient temperature of the measurement resistor and the temperature reference sensor and the ambient temperature resistance from the measurement circuit to correct the ambient temperature resistance.

In some example embodiments, the measurement circuit may provide an indication of a measured quantity as an output, and the controller may correct the measured output by enforcing the mathematical relationship using the resistance of the measurement resistor and the temperature of the measurement resistor. In some example embodiments, the measurement resistor may be one of a plurality of measurement resistors that provide multiple indications of measured quantities as outputs. The measurement circuit may be coupled to the plurality of similar measurement resistors, and the controller may correct the measured outputs by enforcing the mathematical relationship using the measured resistances of the plurality of similar measurement resistors and the temperature of the measurement resistor. In some example embodiments, the electrically-controllable heat source may be a programmable heat source thermally coupled to the measurement resistor and the temperature reference sensor, and controller may select a different heat level of the programmable heat source for the multiple temperatures.

In some example embodiments, the controller may further generate or approximate the mathematical relationship by enforcing a functional temperature dependence assumption for the resistance of the measurement resistor. The functional temperature dependence assumption may be a linear temperature dependence. In some example embodiments, the controller includes a non-volatile memory and stores descriptors of the mathematical relationship in the non-volatile memory. In some example embodiments, the controller may operate the electrically-controllable heat source and store the first values and second values during a wafer or a package test, and the controller may further generate or approximate the mathematical relationship during the wafer or package test.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied in a calibration of a sensor other than a resistive sensor.

What is claimed is:

1. A method of thermally compensating measurements made using measurement resistor that is integrated on a substrate within an integrated circuit, the method comprising:

calibrating the measurements by measuring an indication of a resistance of the measurement resistor, measuring a temperature of the substrate using a temperature reference sensor that is integrated on the substrate and that is thermally coupled to the measurement resistor, heating the substrate with an electrically-controllable heat source that is integrated on the substrate, storing first values of the indication of the resistance of the measurement resistor provided from the measurement circuit and second values corresponding to multiple values of the temperature of the substrate to generate a mathematical relationship relating the indication of the resistance of the measurement resistor to the measured temperature of the substrate over multiple substrate temperatures from the first and second values by repeating the heating and the storing for the multiple substrate temperatures, wherein an ambient temperature of the integrated circuit is not externally adjusted to perform the calibrating, and wherein the resistance of the measurement resistor at any of the multiple substrate temperatures is not adjusted by a result of the calibrating;

subsequent to the calibrating, performing a subsequent measurement using the measurement resistor at an ambient temperature of the integrated circuit with the electrically-controllable heat source disabled;

subsequent to the calibrating, measuring the current temperature of the substrate using the temperature reference sensor; and correcting the subsequent measurement by applying the mathematical relationship generated by the calibrating to the subsequent measurement using the current temperature to compensate for thermal variation of the resistance of the measurement resistor.

2. The method of claim 1, further comprising converting an output of the temperature reference sensor to digital values with an analog-to-digital converter integrated on the substrate and having an input coupled to an output of the temperature reference sensor, and wherein the calibrating and the measurement of the temperature of the substrate during and subsequent to the calibrating are performed using the digital values.

3. The method of claim 1, wherein the calibrating is performed during a wafer or a package test, and wherein the subsequent measurement is performed during on-line operation.

4. The method of claim 1, wherein the subsequent measurement provides an indication of a measured quantity as an output.

5. The method of claim 4, wherein the measurement resistor is one of a plurality of measurement resistors that provide multiple indications of measured quantities as outputs, wherein the performing a subsequent measurement measures a resistance of each of the plurality of similar measurement resistors, and wherein the method further comprises correcting the measured quantities by applying the mathematical relationship to the measured resistances of the plurality of similar measurement resistors and the current temperature of the substrate.

6. The method of claim 1, wherein the electrically-controllable heat source is a programmable heat source thermally coupled to the measurement resistor and the temperature reference sensor, and wherein the operating the electrically-controllable heat source selects a different heat level of the programmable heat source for the multiple temperatures.

7. The method of claim 1, wherein the mathematical relationship enforces a functional temperature dependence assumption for the resistance of the measurement resistor.

8. The method of claim 7, wherein the functional temperature dependence assumption is a linear temperature dependence.

9. The method of claim 1, wherein the storing stores descriptors of the mathematical relationship in a non-volatile memory.

10. The method of claim 1, wherein the calibrating is performed during a wafer or a package test.

11. An integrated circuit integrated on a substrate, the integrated circuit comprising:

a measurement resistor integrated on the substrate;

a temperature reference sensor integrated on the substrate and thermally coupled to the measurement resistor;

a measurement circuit for measuring an indication of a resistance of the measurement resistor;

an electrically-controllable heat source integrated on the substrate for heating the substrate; and a controller having an output coupled to the electrically-controllable heat source, a first input coupled to an output of the temperature reference sensor and a second input coupled to an output of the measurement circuit, wherein the controller operates the electrically-controllable heat source to perform a calibration of measurements made by the measurement resistor by measuring an indication of a resistance of the measurement resistor, measuring a temperature of the substrate using a temperature reference sensor that is integrated on the substrate and that is thermally coupled to the measurement resistor, heating the substrate with an electrically-controllable heat source that is integrated on the substrate, storing first values of the indication of the resistance of the measurement resistor provided from the measurement circuit and second values corresponding to multiple values of the temperature of the substrate to generate or approximate a mathematical relationship relating the indication of the resistance of the measurement resistor to the measured temperature of the substrate over multiple substrate temperatures from the first and second values by repeating the heating and the storing for the multiple substrate temperatures, wherein an ambient temperature of the integrated circuit is not externally adjusted to perform the calibration, and wherein the resistance of the measurement resistor at any of the multiple substrate temperatures is not adjusted by a result of the calibration, wherein the controller, subsequent to the calibration, performs a subsequent measurement using the measurement resistor at an ambient temperature of the integrated circuit with the heat source disabled, measures the current temperature of the substrate using the temperature reference sensor, and corrects the subsequent measurement by applying the mathematical relationship generated by the calibrating to the subsequent measurement using the current temperature to compensate for thermal variation of the resistance of the measurement resistor.

12. The integrated circuit of claim 11, further comprising an analog-to-digital converter having an input coupled to the temperature reference sensor and an output that provides an indication of the measurement temperature, wherein an input of the controller is coupled to the output of the analog-to-digital converter.

13. The integrated circuit of claim 11, wherein the controller performs the calibration during a wafer or a package test and performs the subsequent measurement during on-line operation.

14. The integrated circuit of claim 11, wherein the subsequent measurement provides an indication of a measured quantity as an output.

15. The integrated circuit of claim 14, wherein the measurement resistor is one of a plurality of measurement resistors that provide multiple indications of measured quantities as outputs, wherein the controller performs the subsequent measurement by measuring a resistance of each of the plurality of similar measurement resistors, and corrects the measured quantities by applying the mathematical relationship to the measured resistances of the plurality of similar measurement resistors and the current temperature of the substrate.

16. The integrated circuit of claim 11, wherein the electrically-controllable heat source is a programmable heat source thermally coupled to the measurement resistor and the temperature reference sensor, and wherein controller operates the electrically-controllable heat source to select a different heat level of the programmable heat source for the multiple temperatures.

17. The integrated circuit of claim 11, wherein the mathematical relationship enforces a functional temperature dependence assumption for the resistance of the measurement resistor.

18. The integrated circuit of claim 17, wherein the functional temperature dependence assumption is a linear temperature dependence.

19. The integrated circuit of claim 11, wherein the controller stores descriptors of the mathematical relationship in a non-volatile memory.

20. The integrated circuit of claim 11, wherein the controller performs the calibration during a wafer or a package test.

* * * * *